United States Patent
D'Acunto et al.

(10) Patent No.: US 12,063,285 B2
(45) Date of Patent: Aug. 13, 2024

(54) SELECTING FROM A PLURALITY OF ITEMS WHICH MATCH AN INTEREST

(71) Applicants: KONINKLIJKE KPN N.V., Rotterdam (NL); NEDERLANDSE ORGANISATIE VOOR TOEGEPAST-NATUURWETENSCHAPPELIJK ONDERZOEK TNO, s-Gravenhage (NL)

(72) Inventors: Lucia D'Acunto, Delft (NL); Konstantinos Trichias, Athens (GR); Bastiaan Wissingh, Leiden (NL)

(73) Assignee: KONINKLIJKE KPN N.V., Rotterdam (NL)

( * ) Notice: Subject to any disclaimer, the term of this patent is extended or adjusted under 35 U.S.C. 154(b) by 43 days.

(21) Appl. No.: 16/763,770

(22) PCT Filed: Nov. 16, 2018

(86) PCT No.: PCT/EP2018/081509
§ 371 (c)(1),
(2) Date: May 13, 2020

(87) PCT Pub. No.: WO2019/096970
PCT Pub. Date: May 23, 2019

(65) Prior Publication Data
US 2021/0266379 A1    Aug. 26, 2021

(30) Foreign Application Priority Data

Nov. 17, 2017    (EP) .................................. 17202249

(51) Int. Cl.
*H04L 67/63*    (2022.01)
*G06F 16/13*    (2019.01)
(Continued)

(52) U.S. Cl.
CPC ............ *H04L 67/63* (2022.05); *G06F 16/134* (2019.01); *G06F 16/14* (2019.01); *G06F 16/148* (2019.01);
(Continued)

(58) Field of Classification Search
CPC ......... H04L 29/08549; H04L 29/08945; H04L 29/08972; H04L 67/327; H04L 67/1097;
(Continued)

(56) References Cited

U.S. PATENT DOCUMENTS 6,665,659 B1    12/2003    Logan
2010/0042610 A1*    2/2010    Lakhani ................ G06F 16/907
                                                  707/E17.014
(Continued)

FOREIGN PATENT DOCUMENTS

CN    104603773 A    5/2015
CN    104604205 A    5/2015
(Continued)

OTHER PUBLICATIONS

The International Search Report with Written Opinion for PCT/EP2018/081509 dated Dec. 12, 2018, pp. 1-11.
(Continued)

*Primary Examiner* — Yu-Wen Chang
(74) *Attorney, Agent, or Firm* — McDonnell Boehnen Hulbert & Berghoff LLP (57) ABSTRACT

A network node (1) is configured to receive an interest message comprising a request for a data object and metadata. The metadata specifies one or more criteria for selecting a subset of a plurality of items. The network node is further configured to determine whether there is a match between the requested data object and a plurality of items (e.g. from a CS or FIB) and select a subset of the plurality of items by applying the one or more criteria if the match has
(Continued)

been determined to exist. At least one of the criteria is a preference specified for at least one of: factual properties of the plurality of items, usage data related to the plurality of items, usage data related to the at least one communication interface, an effort to obtain data from another network node, and a position in a range specified in the interest message.

16 Claims, 4 Drawing Sheets

(51) Int. Cl.
  *G06F 16/14*   (2019.01)
  *H04L 45/748*   (2022.01)
  *H04L 67/1097*   (2022.01)

(52) U.S. Cl.
  CPC ........ *H04L 45/748* (2013.01); *H04L 67/1097* (2013.01)

(58) Field of Classification Search
  CPC ..... H04L 45/74; H04L 45/742; H04L 45/745; H04L 45/7453; H04L 45/748; H04L 67/63; G06F 16/134; G06F 16/14; G06F 16/148; G06F 16/152; G06F 16/38; G06F 16/383; G06F 16/387; G06F 16/48; G06F 16/483; G06F 16/487; G06F 16/58; G06F 16/583; G06F 16/587; G06F 16/68; G06F 16/683; G06F 16/687; G06F 16/78; G06F 16/783; G06F 16/787; G06F 16/83; G06F 16/832; G06F 16/835; G06F 16/8373; G06F 16/90344; G06F 16/907; G06F 16/908; G06F 16/909; G06F 12/0802; G06F 16/335; G06F 16/13
  See application file for complete search history.

(56) References Cited

U.S. PATENT DOCUMENTS

| | | | |
|---|---|---|---|
| 2011/0246471 A1 | 10/2011 | Rakib | |
| 2013/0219081 A1 | 8/2013 | Qian et al. | |
| 2014/0023072 A1 | 1/2014 | Lee et al. | |
| 2014/0289325 A1* | 9/2014 | Solis | G06Q 10/06 709/204 |
| 2015/0120759 A1* | 4/2015 | Kang | G06F 16/24578 707/748 |
| 2015/0134781 A1 | 5/2015 | Silberstein et al. | |
| 2015/0350078 A1* | 12/2015 | Azgin | H04L 45/745 370/392 |
| 2015/0381557 A1* | 12/2015 | Fan | H04L 61/10 709/245 |
| 2016/0019275 A1* | 1/2016 | Mosko | H04L 67/63 707/610 |
| 2016/0021172 A1 | 1/2016 | Mahadevan et al. | |
| 2016/0044126 A1* | 2/2016 | Mahadevan | H04L 67/10 709/213 |
| 2016/0085830 A1* | 3/2016 | Mahadevan | G06F 16/2455 707/730 |
| 2017/0048346 A1* | 2/2017 | Ravindran | H04N 21/20 |
| 2017/0118136 A1 | 4/2017 | Oran | |
| 2017/0289114 A1* | 10/2017 | Wood | H04L 67/63 |
| 2018/0077052 A1* | 3/2018 | Moiseenko | H04L 65/80 |
| 2018/0109454 A1* | 4/2018 | Holmberg | H04L 45/306 |
| 2018/0287940 A1* | 10/2018 | Westphal | H04L 45/745 |
| 2019/0089811 A1* | 3/2019 | White | H04L 45/16 |
| 2019/0158395 A1* | 5/2019 | van Brandenburg | H04L 45/566 |
| 2019/0306234 A1* | 10/2019 | Gill | H04L 67/327 |
| 2020/0050627 A1* | 2/2020 | Satou | G06F 16/2471 |
| 2020/0296570 A1* | 9/2020 | Inam | H04W 8/08 |

FOREIGN PATENT DOCUMENTS

| | | |
|---|---|---|
| CN | 105049466 A | 11/2015 |
| CN | 105282215 A | 1/2016 |
| EP | 2 998 886 | 3/2016 |
| WO | 2015/185756 | 12/2015 |

OTHER PUBLICATIONS

European Search Report for European Application No. 17202249.3 dated Apr. 23, 2018, pp. 1-9.
"Named data networking", Zhang et al., ACM SIGCOMM Computer Communication Review 44 Issue 3, Jul. 2014, pp. 66-73.
"Extending Named Data Networking with Support for Names with Range Indications", B. Wissingh, L. D'Acunto, Proceedings of the 3rd AM Conference on Information-Centric Networking, Sep. 2016.
"NFD Developer's Guide", A. Afanasyev et al., Technical Report NDN-0021, Revision 7, Oct. 2016.
Named Data Networking, NDN Packet Format Specification 0.2-2 documentatio (index.html) Interest Packet, https://named-data.net/doc/ndn-tlv/interest.html, Retrieved on Jun. 13, 2017.
Ravidran, R. et al. "Forwarding Label support in CCN Protocol draft-ravi-icnrg-con-forwarding-label-00", ICN Research Group Internet-Draft, version 0. (https://tools.ietf.org/html/draft-ravi-icnrg-con-forwarding-label-00), Nov. 16, 2016.
A.Afanasyev, C.Yi, L.Wang, B.Zhang and L.Zhang, 'Scaling NDN Routing: Old Tale, New Design', NON technical report NDN-004, Revision 1, Jul. 2013.
Ahmed et al., Springer Briefs in Electrical and Computer Engineering, Content-Centric Networks an Overview, Applications and Research Challenges, Mar. 1, 2016, pp. 1-104, SpringerNature, Singapore Pte Ltd.

* cited by examiner

SELECTING FROM A PLURALITY OF ITEMS WHICH MATCH AN INTEREST

CROSS REFERENCE TO RELATED APPLICATIONS

The present application is a national stage entry of, and claims priority to, PCT/EP2018/081509, filed on Nov. 16, 2018, which claims priority to European Patent Application EP 17202249.3, filed in the European Patent Office on Nov. 17, 2017, both of which are hereby incorporated in their entirety herein by reference.

FIELD OF THE INVENTION

The invention relates to a network node for receiving an interest message and a requesting node for transmitting an interest message.

The invention further relates to a method of receiving an interest message and a method of transmitting an interest message.

The invention also relates to a computer program product enabling a computer system to perform such methods.

BACKGROUND OF THE INVENTION

Information-Centric Networking (ICN) is a new networking paradigm with the goal of evolving the current Internet infrastructure away from a host-oriented system towards a data-oriented system. Instead of addressing endpoints via IP addresses, data itself is addressed in ICN. By dividing data into chunks, and giving each of those chunks a unique and hierarchical name, ICN allows clients to ask the network for a given named data object, without having to worry where that data is located/stored. One of the benefits of naming data is that each intermediate network node, such as a switch or a router, has the ability to cache the data packets that flow through it. In this way, if a new consumer requests data which is already cached in the network, its request does not need to travel through the network towards the original producer of the data, but can instead be served by one of the intermediate network nodes holding a copy of that data.

Current ICN architectures have two elementary types of messages at their core: interest messages and data messages. When an application wants to retrieve a particular data object, it sends out an interest message for that data object. The most important part of this interest message is the name of the object, or, in cases where the full name of the object is not known, a prefix.

An example of such an ICN architecture is Named Data Networking (NDN) described in "Named data networking", Zhang et al., ACM SIGCOMM Computer Communication Review 44 Issue 3, July 2014, pages 66-73. This publication describes that when a network node receives an interest message, it first checks whether its Content Store (CS—the node's cache) happens to contain a named data object that matches the name in the interest message. If a corresponding named data object is found, it is wrapped in a data message and sent back over the interface over which the interest message was received.

In the case where the object is not cached, the next step is to check whether the requested name is already in the so-called Pending Interest Table (PIT). The PIT maintains a list of existing, pending data object requests and the corresponding interfaces through which they were requested. When a data message comes in, it is forwarded to all interfaces that according to the PIT have an unsatisfied interest for the corresponding name. The entry in the PIT is then deleted. When a name in an incoming interest message is not listed in the PIT, it is added along with the interface over which it was received. The interest message is then forwarded on one or more outgoing interfaces according to the Forwarding Information Base (FIB—the ICN equivalent of a routing table) and the Strategy layer, in search of the requested data at another node. In an alternative implementation, the network node first checks whether the requested name is already in the PIT and only checks whether its CS happens to contain a named data object that matches the name in the interest message if it is not.

Now, in both the cases when checking the CS or FIB, there may be multiple entries whose name matches the name indicated in the interest. A scenario which becomes even more likely when Range Name Components (RNC) are used in the interest name. Range Name Components are described in "Extending Named Data Networking with Support for Names with Range Indications", B. Wissingh, L. D'Acunto, Proceedings of the 3rd AM Conference on Information-Centric Networking, September 2016.

A so-called "data selection strategy" is applied by an ICN router to select which data item to return to the requester. When an ICN router receives an interest matching multiple CS entries, then by default the leftmost child (the data object whose name is first in an alphabetic ordering of matching names) is selected. It is possible to specify in an interest message that the next network node should instead select the rightmost child (the data object whose name is last in an alphabetic ordering of matching names) using the "Child-Selector" field. It is also possible to specify in the interest message whether the returned data item must be fresh using the "MustBeFresh" field. If the FreshnessPeriod of the selected (leftmost or rightmost) child has expired, no data item is returned. The FreshnessPeriod cannot be set by the requestor.

Similarly, a so-called "forwarding strategy" takes care of deciding on the communication interface on which a certain interest message is forwarded. "NFD Developer's Guide", A. AFANASYEV et al., Technical Report NDN-0021, Revision 7, October 2016 describes the various forwarding strategies supported in NDN. It is not necessary to select only one communication interface to forward interest messages on. When using the Multicast strategy, every interest message is forwarded on all communication interfaces that correspond to a prefix in the FIB to which the interest name matches. Often, the Best Route strategy is used, according to which an interest message is forwarded on the communication interface, i.e. to the upstream node, with the lowest routing cost.

The NDN Developer's Guide also discloses two strategies in which network properties are used to decide on the communication interface on which a certain interest message is forwarded: the NCC and Access Router strategies. The NCC strategy is a reimplementation of CCNx0.7.2 default strategy and essentially selects the interface on which the interest will be sent based on the interface's ability to return the forwarded data within a certain time-out. The basic idea of the Access Router strategy is to multicast the first interest, learn which next hop can serve the content, and forward the bulk of subsequent interests towards the chosen next hop. If the next hop does not respond, the strategy involves starting to multicast again to find an alternative path.

Thus, these data selection and forwarding strategies in NDN allow network nodes to make decisions based either on the names of the data matches, such as the ChildSelector, which returns the matching entry that comes first or last alphabetically, or based on network properties e.g. the NCC and Access Router strategies. However, the requesting node (i.e. the requestor) may still be required to perform different iterations to obtain the sought data object, or may not receive the sought data object fast enough, or not receive the sought data object at all (i.e. receive an unwanted data object instead).

EP 2 998 886 A1 describes a content-discovery system allowing a node in a Content Centric Networks (CCN) to discover content over CCN. The CCN node can generate an Interest that includes a query for discovering content associated with a given name prefix, and after disseminating the Interest over CCN, can receive a query-result Content Object that includes a listing of matching Content Objects and their reputation information. The CCN node can also process Interests issued by other CCN nodes that would like to discover content. After receiving an Interest comprising a query for discovering content, the CCN node searches a repository for a set of Content Objects that match the query. The CCN node generates a results list that includes the Content Object in the search results and their reputation information. The CCN node then generates and returns a query-result Content Object that includes the Interest's name, and whose payload includes the results list.

US 2017/118136 A1 describes a network device in a Named Data Networking (NDN) network which receives an Interest from a consumer including a name and an Expected Data Size of data requested through the Interest. The network device forwards the Interest along a path to a producer of the data based on the name. As a result, the network device receives data that has traversed the path in reverse and satisfies the forwarded Interest. The network device determines an actual data size of the received data. The network device compares the actual data size to the Expected Data Size. If the actual data size is greater than the expected data size, and if a level of traffic congestion associated with forwarding the received data to the consumer is below a threshold, forwarding the received data to the consumer along a path based on the name of the data.

SUMMARY OF THE INVENTION

It is a first object of the invention to provide a network node, which is able to select one or more items from a plurality of items which match an interest such that a requesting node is able to obtain a sought data object sufficiently fast.

It is a second object of the invention to provide a requesting node, which helps a network node select one or more items from a plurality of items which match an interest such that the requesting node is able to obtain a sought data object sufficiently fast.

It is a third object of the invention to provide a method of receiving an interest message, which helps a network node select one or more items from a plurality of items which match an interest such that a requesting node is able to obtain a sought data object sufficiently fast.

It is a fourth object of the invention to provide a method of transmitting an interest message, which helps a network node select one or more items from a plurality of items which match an interest such that a requesting node is able to obtain a sought data object sufficiently fast.

According to the invention, the first object is realized in that the network node comprises at least one communication interface and at least one processor configured to receive an interest message on a communication interface of said at least one communication interface, said interest message comprising a request for a data object and metadata, said metadata specifying one or more criteria to be used for selecting a subset of a plurality of items, determine whether there is a match between said requested data object and a plurality of items, and select a subset of said plurality of items by applying said one or more criteria if said match has been determined to exist, wherein at least one of said one or more criteria is a preference specified for at least one of: factual properties of said plurality of items, usage data related to said plurality of items, usage data related to said at least one communication interface, an effort to obtain data from another network node, and a position in a range specified in said interest message.

By allowing a requesting node to specify in metadata of the interest message one or more criteria for selecting a subset of a plurality of items, of which at least one criterion is a preference specified for at least one of: factual properties of the plurality of items, usage data related to the plurality of items, usage data related to the at least one communication interface, an effort to obtain data from another network node, and a position in a range specified in the interest message, and applying these one or more criteria at the network node, the requesting node (and possibly the user thereof) is provided more flexibility and higher customization capabilities. This additional flexibility and these higher customization capabilities allow the requesting node to obtain the sought data object faster and reduce the number of unwanted data objects that it receives. The one or more criteria are used to select one or more items from a plurality of items which match the interest, but should preferably be ignored when only one item matches the interest. Preferably, matching is initially done based on name. Once a plurality of matches is found, the one or more criteria are applied to narrow done the matches.

A preference specified for factual (objective) properties of items, e.g. the sizes or content types of the data objects, increases the chance that the returned data object matches the requesting node's preferences compared to the known "ChildSelector" field, which specifies a preference for unfactual (subjective) properties of data objects, i.e. the names of the data objects. Similarly, the "MustBeFresh" field specifies a requirement for unfactual (subjective) properties of data objects, because the FreshnessPeriod is set (chosen) by the content producer and cannot be set by the requesting node. Furthermore, the "MustBeFresh" field specifies a requirement rather than a preference, because no data object is returned if only one data object in the CS matches the required data object and the FreshnessPeriod of this one data object has expired.

A data selection strategy and/or a forwarding strategy that allows the network node to make use of usage data will in most cases return the sought data object faster. Since a requesting node may know whether he is looking for a popular data object or not, it is beneficial to allow the requesting node to specify which usage data to preferably use. Allowing the requesting node to specify a preference for a position in a range specified in the interest message provides more customization capabilities when a Range Name Component (RNC) is used in the interest name. The above-mentioned criteria may also be beneficially applied when they are configured in the network node, e.g. in user-specific policies, in addition to or instead of being specified in the metadata of the interest message.

Said at least one processor may be configured to determine whether a plurality of data objects in one or more memories of said network node matches said requested data object and select one of said plurality of data objects by applying said one or more criteria and return said selected data object in a data message on said communication interface of said at least one communication interface if said plurality of data objects has been determined to match said requested data object, wherein at least one of said one or more criteria is a preference specified for at least one of: factual properties of said plurality of data objects, usage data related to said plurality of data objects, and a position in a range specified in said interest message. This provides more flexibility and higher customization capabilities to the requesting node with respect to the data selection strategy.

Said one or more criteria may comprise a criterion which is a preference specified for factual properties of said plurality of data objects and comprises at least one of: a preferred data object size, a preferred minimum data object size, a preferred maximum data object size, a preferred data object content type, a preference for a date and time after which the data object was produced, a preference for a date and time before which the data object was produced, and a preference for the most recently produced data object, for example.

Said one or more criteria may comprise a criterion which is a preference specified for usage data related to said plurality of data objects and comprises at least one of: a preference for the most frequently transmitted data object, a preference for the least frequently transmitted data object, a preference for the most recently transmitted data object, and a preference for the least recently transmitted data object, for example.

Said at least one processor may be configured to record a time at which said selected data object is returned upon returning said selected data object in said data message. This may help the network node gather Most Recently Used (MRU) and Least Recently Used (LRU) statistics if at least one of the one or more criteria is a preference specified for usage data related to the plurality of data objects.

Said at least one processor may be configured to record a number of times said selected data object has been returned upon returning said selected data object in said data message. This may help the network node gather Most Frequently Used (MFU) and Least Frequently Used (LFU) statistics if at least one of the one or more criteria is a preference specified for usage data related to the plurality of data objects.

Said at least one processor may be configured to determine whether said requested data object matches one or more prefixes in a forwarding table and whether said one or more matching prefixes are associated with a plurality of communication interfaces and may be further configured to select a subset of said plurality of communication interfaces by applying said one or more criteria and forward said interest message on said subset of said plurality of communication interfaces if said one or more matching prefixes are associated with a plurality of communication interfaces, wherein at least one of said one or more criteria is a preference specified for at least one of: usage data related to said at least one communication interface, an effort to obtain data from another network node, and a position in a range specified in said interest message.

This provides more flexibility and higher customization capabilities to the requesting node with respect to the forwarding strategy. Furthermore, by forwarding interest messages to the most likely destination and thereby avoiding having to send additional interest messages, the load on the network may be reduced. A requested data object may match one or more prefixes in a forwarding table if the name of the requested data object matches the one or more prefixes in the forwarding table.

If the name of the requested data object comprises a range, it becomes more likely that the name matches multiple prefixes in the forwarding table. Each prefix is normally associated with at least one communication interface and thus, multiple prefixes are normally associated with multiple communication interfaces, although these multiple communication interfaces are not necessarily (all) different. By selecting a subset of the multiple prefixes based on a specified position in the range, a subset of the multiple communication interfaces is selected. Furthermore, a single prefix may be associated with multiple communication interfaces. In such a case, usage data relating to the multiple communication interfaces and/or the effort to obtain data from another network node (e.g. to obtain data on a certain communication interface) may be used to select a subset of these multiple communication interfaces.

Said one or more criteria may comprise a criterion which is a preference specified for an effort to obtain data from another network node and comprises a preferred maximum number of hops between the originator of said interest message and a network node which stores and transmits a data object matching said requested data object and/or a preferred maximum latency between the originator of said interest message and a network node which stores and transmits a data object matching said requested data object, for example.

Said one or more criteria may comprise a criterion which is a preference specified for usage data related to said at least one communication interface and comprises at least one of: a preference for a communication interface on which data messages have been received most frequently, a preference for a communication interface on which data messages have been received least frequently, a preference for a communication interface on which a data message was received most recently, and a preference for a communication interface on which a data message was least recently received, for example. When this criterion is applied at the network node, the network node will normally exclude the communication interface on which the interest message was received from consideration, as it does not want to forward an interest message to a network node that already received the interest.

Said at least one processor may be configured to record a time at which a data message is received on a communication interface upon receiving said data message on said communication interface. This may help the network node gather Most Recently Used (MRU) and Least Recently Used (LRU) statistics if at least one of the one or more criteria is a preference specified for usage data related to the at least one communication interface.

Said at least one processor may be configured to record a number of times the data messages have been received on a communication interface upon receiving a data message on said communication interface. This may help the network node gather Most Frequently Used (MFU) and Least Frequently Used (LFU) statistics if at least one of the one or more criteria is a preference specified for usage data related to the at least one communication interface.

According to the invention, the second object is realized in that the requesting node comprises at least one communication interface and at least one processor configured to create an interest message comprising a request for a data object and metadata specifying one or more criteria to be used by a network node for selecting a subset of a plurality of items when there is a match between said requested data object and said plurality of items, at least one of said one or more criteria being a preference specified for at least one of: factual properties of said plurality of items, usage data related to said plurality of items, usage data related to at least one communication interface of said network node, an effort to obtain data from another network node, and a position in a range specified in said interest message, and transmit said interest message on said at least one communication interface.

According to the invention, the third object is realized in that the method of receiving an interest message comprises receiving an interest message, said interest message comprising a request for a data object and metadata, said metadata specifying one or more criteria to be used for selecting a subset of a plurality of items, determining whether there is a match between said requested data object and a plurality of items and, and selecting a subset of said plurality of items by applying said one or more criteria if said match has been determined to exist, wherein at least one of said one or more criteria is a preference specified for at least one of: factual properties of said plurality of items, usage data related to said plurality of items, usage data related to at least one communication interface, an effort to obtain data from another network node, and a position in a range specified in said interest message. Said method may be performed by software running on a programmable device. This software may be provided as a computer program product.

According to the invention, the fourth object is realized in that the method of transmitting an interest message comprises creating an interest message comprising a request for a data object and metadata specifying one or more criteria to be used by a network node for selecting a subset of a plurality of items when there is a match between said requested data object and said plurality of items, at least one of said one or more criteria being a preference specified for at least one of: factual properties of said plurality of items, usage data related to said plurality of items, usage data related to at least one communication interface, an effort to obtain data from another network node, and a position in a range specified in said interest message, and transmitting said interest message. Said method may be performed by software running on a programmable device. This software may be provided as a computer program product.

Moreover, a computer program for carrying out the methods described herein, as well as a non-transitory computer readable storage-medium storing the computer program are provided. A computer program may, for example, be downloaded by or uploaded to an existing device or be stored upon manufacturing of these systems.

A non-transitory computer-readable storage medium stores at least a first software code portion, the first software code portion, when executed or processed by a computer, being configured to perform executable operations comprising: receiving an interest message, said interest message comprising a request for a data object and metadata, said metadata specifying one or more criteria to be used for selecting a subset of a plurality of items, determining whether there is a match between said requested data object and a plurality of items and, and selecting a subset of said plurality of items by applying said one or more criteria if said match has been determined to exist, wherein at least one of said one or more criteria is a preference specified for at least one of: factual properties of said plurality of items, usage data related to said plurality of items, usage data related to at least one communication interface, an effort to obtain data from another network node, and a position in a range specified in said interest message.

A non-transitory computer-readable storage medium stores at least a second software code portion, the second software code portion, when executed or processed by a computer, being configured to perform executable operations comprising: creating an interest message comprising a request for a data object and metadata specifying one or more criteria to be used by a network node for selecting a subset of a plurality of items when there is a match between said requested data object and said plurality of items, at least one of said one or more criteria being a preference specified for at least one of: factual properties of said plurality of items, usage data related to said plurality of items, usage data related to at least one communication interface, an effort to obtain data from another network node, and a position in a range specified in said interest message, and transmitting said interest message.

As will be appreciated by one skilled in the art, aspects of the present invention may be embodied as a device, a method or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of devices, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

BRIEF DESCRIPTION OF THE DRAWINGS

These and other aspects of the invention are apparent from and will be further elucidated, by way of example, with reference to the drawings, in which.

Corresponding elements in the drawings are denoted by the same reference numeral.

DETAILED DESCRIPTION OF THE DRAWINGS

Figure 1:
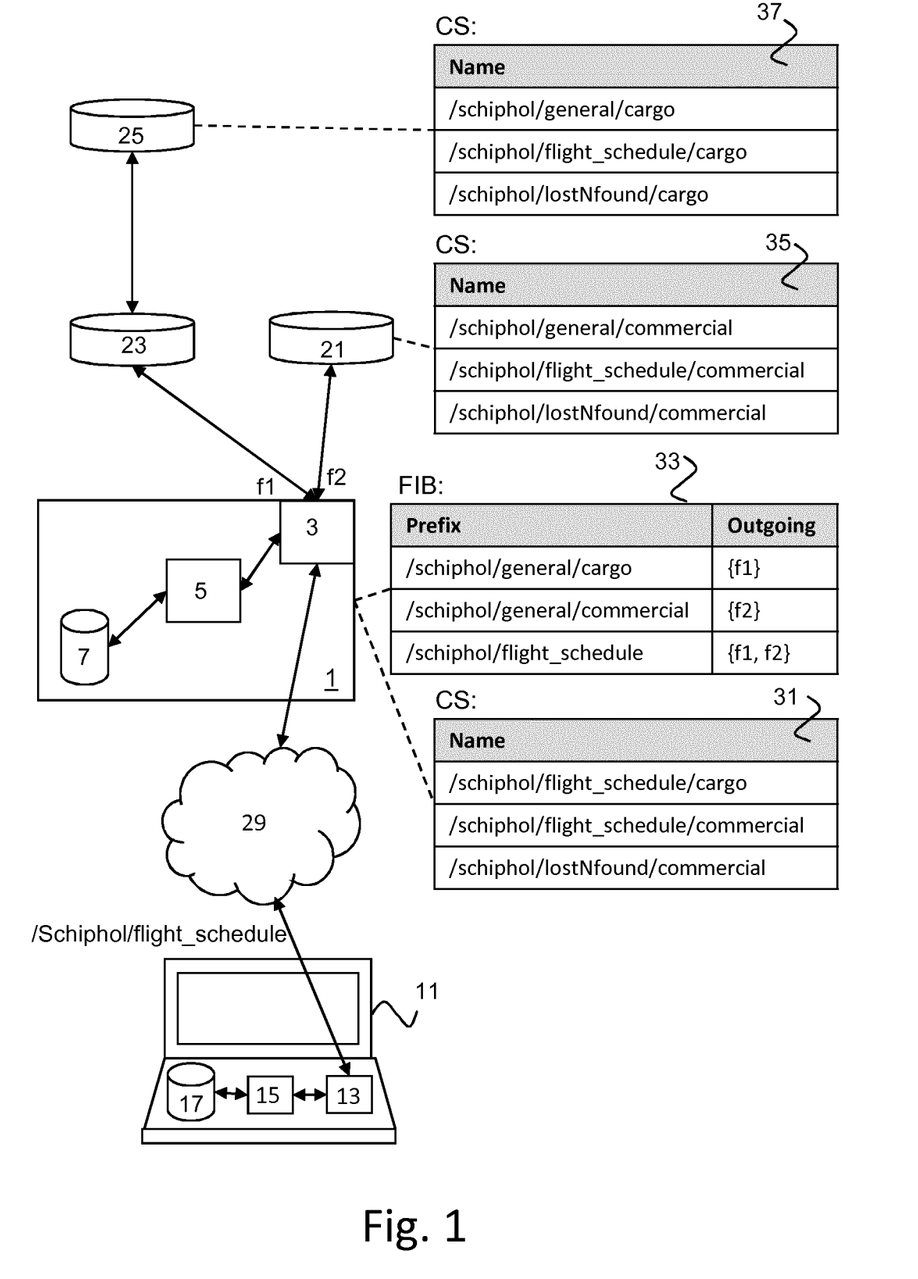
FIG. 1 is a block diagram of first embodiments of the network node and the requesting node of the invention.

Embodiments of the network node and the requesting node of the invention and further network nodes 21, 23 and 25 are shown in FIG. 1. The network node 1 comprises a set of communication interfaces 3, a processor 5 and a memory 7. The processor 5 is configured to receive an interest message on a communication interface of the set of communication interfaces 3. The interest message comprises a request for a data object and metadata. The metadata specifies one or more criteria to be used for selecting a subset of a plurality of items. The processor 5 is further configured to determine whether there is a match between the requested data object and a plurality of items and select a subset of the plurality of items by applying the one or more criteria if the match has been determined to exist. At least one of the one or more criteria is a preference specified for at least one of: factual properties of the plurality of items, usage data related to the plurality of items, usage data related to the at least one communication interface, an effort to obtain data from another network node, and a position in a range specified in the interest message.

The requesting node 11 comprises a communication interface 13, a processor 15 and a memory 17. The processor 15 is configured to create an interest message comprising a request for a data object and metadata specifying one or more criteria to be used by a network node for selecting a subset of a plurality of items when there is a match between the requested data object and the plurality of items. At least one of the one or more criteria is a preference specified for at least one of: factual properties of the plurality of items, usage data related to the plurality of items, usage data related to at least one communication interface of the network node, an effort to obtain data from another network node, and a position in a range specified in the interest message. The processor 15 is further configured to transmit the interest message on the communication interface 13.

In the embodiment of FIG. 1, the processor 5 is configured to determine whether a plurality of data objects in the memory 7 of the network node matches the requested data object and select one of the plurality of data objects by applying the one or more criteria and return the selected data object in a data message on the communication interface of set of communication interfaces 3 if the plurality of data objects has been determined to match the requested data object. In other words, the invention is applied as part of the data selection strategy. The selection can be performed if at least one of the one or more criteria is a preference specified for at least one of: factual properties of the plurality of data objects, usage data related to the plurality of data objects, and a position in a range specified in the interest message.

In the embodiment of FIG. 1, the processor 5 is further configured to record a time at which the selected data object is returned upon returning the selected data object in the data message and record a number of times the selected data object has been returned upon returning the selected data object in the data message.

In the embodiment of FIG. 1, the processor 5 is configured to determine whether the requested data object matches one or more prefixes in a forwarding table and whether the one or more matching prefixes are associated with a plurality of communication interfaces of the set of communication interfaces 3 and if the one or more matching prefixes are associated with a plurality of communication interfaces, select a subset of the plurality of communication interfaces by applying the one or more criteria and forward the interest message on the subset of the plurality of communication interfaces. In other words, the invention is applied as part of the data forwarding strategy. The selection can be performed if at least one of the one or more criteria is a preference specified for at least one of: usage data related to the at least one communication interface, an effort to obtain data from another network node, and a position in a range specified in the interest message.

In the embodiment of FIG. 1, when the requested data object is determined to match a plurality of prefixes in the forwarding table and if the interest message indicates a preference specified for a position in a range specified in the (e.g. name of the) interest message, this preference is used to select a subset of the prefixes. If each prefix is associated with at least one communication interface, this means that the matching prefixes are associated with a plurality of communication interfaces and that by selecting a subset of the matching prefixes, a subset of the (plurality of) communication interfaces is selected, although the communication interfaces in this subset are not necessarily (all) different.

If the interest message further indicates a preference for the use of (certain) usage data and/or for a certain (maximum) effort to obtain data from another network node, this preference or these preferences can be used to select a subgroup of the subset of communication interfaces, i.e. to reduce the subset even further. If the interest message does not specify a criterion which can be used to select a subgroup of the subset of communication interfaces, the interest message may be forwarded on all communication interfaces of the subset. If the subset comprises multiple instances of the same communication interface, the interest message only needs to be forwarded once on this communication interface.

In the embodiment of FIG. 1, the processor 5 is further configured to record a time at which a data message is received on a communication interface upon receiving the data message on the communication interface and record a number of times data messages have been received on a communication interface upon receiving a data message on the communication interface.

FIG. 1 depicts an example in which a 'commercial' user (i.e. interested in passenger flights) requests information regarding the flight schedule of Schiphol airport in Amsterdam using an interest with the name /Schiphol/flight_schedule. Upon receipt of this interest by network node 1 over the network (e.g. Internet) 29, network node 1 will have to make a decision regarding which data to use from its CS stored in memory 7 to respond to this interest or (if it has no data) which interface to use to forward this interest on, based on its FIB. The FIB may be stored in memory 7 as well.

In the example of FIG. 1, the CS 31 of network node 1 is populated as follows:

| Name |
|---|
| /schiphol/flight_schedule/cargo |
| /schiphol/flight_schedule/commercial |
| /schiphol/lostNfound/commercial |

The incoming interest therefore matches two entries of the CS (entries 1 & 2). In the current NDN implementation, network node 1 would have selected a data object from its CS which would not always be the desired data object. If a strategy of selecting the data object based on alphabetic order would have been followed by network node 1, it would have resulted in the return of the data object /Schiphol/flight_schedule/cargo, which is not the data object the requesting node 11 desires (as its user is a commercial user).

Assuming that most users requesting this information are 'commercial' users (individual persons using commercial flights are orders of magnitude more than companies using cargo flights), this is not the desired data object for the majority of requesting nodes, which would hence need to transmit an additional interest message in order to retrieve the desired data object.

For this reason, the network node 1 has been configured to be able to decide better which of the multiple matches in its CS to return. In the embodiment of FIG. 1, the network node 1 decides this based on usage data on request of the requesting node 11. Since likely the flight schedule for commercial flights is accessed much more frequently (and probably more recently) than the flight schedule for cargo flights, a strategy that uses the Most Frequently Used (MFU) or Most Recently Used (MRU) statistics results in the return of the data object /Schiphol/flight_schedule/commercial. In most cases, returning that data object result in faster user satisfaction and less interest message retransmissions. Use of the MFU statistics comprises selecting the matching data object with the highest number of times this data object has been returned in this case. Use of the MRU statistics comprises selecting the matching data object with the most recent recorded time at which this data object was returned in this case.

If the network node 1 would have had no matching data objects in its CS, the network node 1 would have had to decide over which communication interface to forward the incoming interest based on its FIB entries. In the example of FIG. 1, FIB 33 of network node 1 is populated as follows:

| Prefix | Outgoing |
|---|---|
| /schiphol/general/cargo | {f1} |
| /schiphol/general/commercial | {f2} |
| /schiphol/flight_schedule | {f1, f2} |

There are two interfaces that satisfy the criteria (f1 & f2, as specified in entry 3) for the incoming interest and the decision of network node 1 depends on the applied forwarding strategy. In the current NDN implementation, network node 1 would have either only forwarded the interest message on one of these two interfaces (to the one with the lower cost) if the 'Best route' forwarding strategy would have been used or it would have forwarded the interest message on both interfaces if the 'Multicast' forwarding strategy would have been used.

Both of these outcomes are not optimal, as can be seen in CS 35 of the network node 21 and CS 37 of the network node 25, respectively:

| Name |
| --- |
| /schiphol/general/commercial |
| /schiphol/flight_schedule/commercial |
| /schiphol/lostNfound/commercial |

| Name |
| --- |
| /schiphol/general/cargo |
| /schiphol/flight_schedule/cargo |
| /schiphol/lostNfound/cargo |

In the first case ("Best route" forwarding strategy), the interest message would have been forwarded over interface f1 to network nodes 23 and 25 and it would then have travelled longer in the network (than if the interest message had been forwarded to network node 21) and would have returned a data object that is useless to the user, as the user is a commercial user and not interested in cargo. In the second case ("Multicast" forwarding strategy), the interest message would have been forwarded over both interfaces reaching network nodes 21, 23 and 25 and this would have resulted in the return of the desired data object, but at the cost of imposing an increased load on the network by multicasting all interest messages.

For this reason, the network node 1 has been configured to be able to decide better which communication interface(s) to forward the interest name on. In the embodiment of FIG. 1, the network node 1 decides this based on usage data on request of the requesting node 11.

Similar as when selecting a data object from the CS, a strategy that uses the Most Frequently Used (MFU) or Most Recently Used (MRU) statistics may be used, which leads to the decision to forward the interest message over interface f2 and results in the desired data object /Schiphol/flight_schedule/commercial being returned by network node 21. In this case, use of the MFU statistics comprises selecting a communication interface (from communication interfaces associated with the one or more prefixes which match the interest) on which data objects have been received the highest number of times. In this case, use of the MRU statistics comprises selecting a communication interface (from communication interfaces associated with the one or more prefixes which match the interest) on which a data object has been received most recently in this case.

If a matching prefix is associated with the communication interface on which the interest message was received, this communication interface is disregarded. Statistics may not only be gathered per interface with respect to received data objects, but also with respect to received interest messages. This helps in case interests received on a certain interface are often similar to each other, but not similar to interests received on another interface. In the example shown in FIG. 1, if the network node 1 would be connected to the Internet and to an Intranet via different interfaces, it might be possible to determine from the interface on which the interest message is received (i.e. the incoming interface) whether the user is likely interested in commercial flights (if the interest message is received via the Internet), for example.

The network node 1 may be a network router, for example. The network node 1 may be a dedicated router or may be a user device performing network routing, for example. The network node 1 may be a mobile device, for example. In the embodiment shown in FIG. 1, the network node 1 comprises one processor 5. In an alternative embodiment, the network node 1 comprises multiple processors. The processor 5 of the network node 1 may be a general-purpose processor, e.g. an Intel or an AMD processor, or an application-specific processor, for example. The processor 5 may comprise multiple cores, for example. The processor 5 may run a Unix-based or Windows operating system, for example. In the embodiment shown in FIG. 1, the network node 1 comprises one device. In an alternative embodiment, the network node 1 comprises multiple devices.

The set of communication interfaces 3 may comprise one or more optical ports, one or more wireless transceivers and/or one or more Ethernet ports, for example. The set of communication interfaces 3 may comprise one or more internal interfaces, for example. If the network node 1 is running both a client and a server, the client and the server may use an internal communication interface to exchange interest messages and data messages, for example. An internal communication interface may comprise a Unix domain socket and/or an inter-process communication socket, for example. In the embodiment of FIG. 1, the processor 5 uses the set of communication interfaces 3 to communicate with network nodes 21 and 23 and to access the network 29.

The memory 7 may comprise one or more magnetic hard disks, one or more optical drives, and/or one or more solid state memories, for example. The memory 7 may be used to store data objects (as part of data message and/or separately) and/or other information like a Pending Interest Table (PIT) and a Forwarding Information Base (FIB), for example. The collection of stored data objects may be referred to as a Content Store (CS). The network nodes 21-25 may comprise a processor configured in the same way as the processor 5 of network node 1.

The requesting node 11 may be a user device, for example. The requesting node 11 may be a laptop, a tablet, a mobile phone, a device embedded in a vehicle or a vehicle, for example. The requesting node 11 may further comprise a display. In the embodiment shown in FIG. 1, the requesting node 11 comprises one processor 15. In an alternative embodiment, the requesting node 11 comprises multiple processors. The processor 15 of the requesting node 11 may be a general-purpose processor, e.g. an Intel or an AMD processor, or an application-specific processor, for example. The processor 15 may comprise multiple cores, for example. The processor 15 may run a Unix-based operating system, for example.

The communication interface 15 may comprise a wired and/or wireless (e.g. cellular and/or WiFi) data transceiver for example. The requesting node 11 may further comprise other components typical for a user device, e.g. a power supply. The memory 17 may comprise one or more magnetic hard disks, one or more optical drives, and/or one or more solid state memories, for example. The memory 17 may be used for storing received data objects and/or for storing a PIT, for example.

Figure 2:
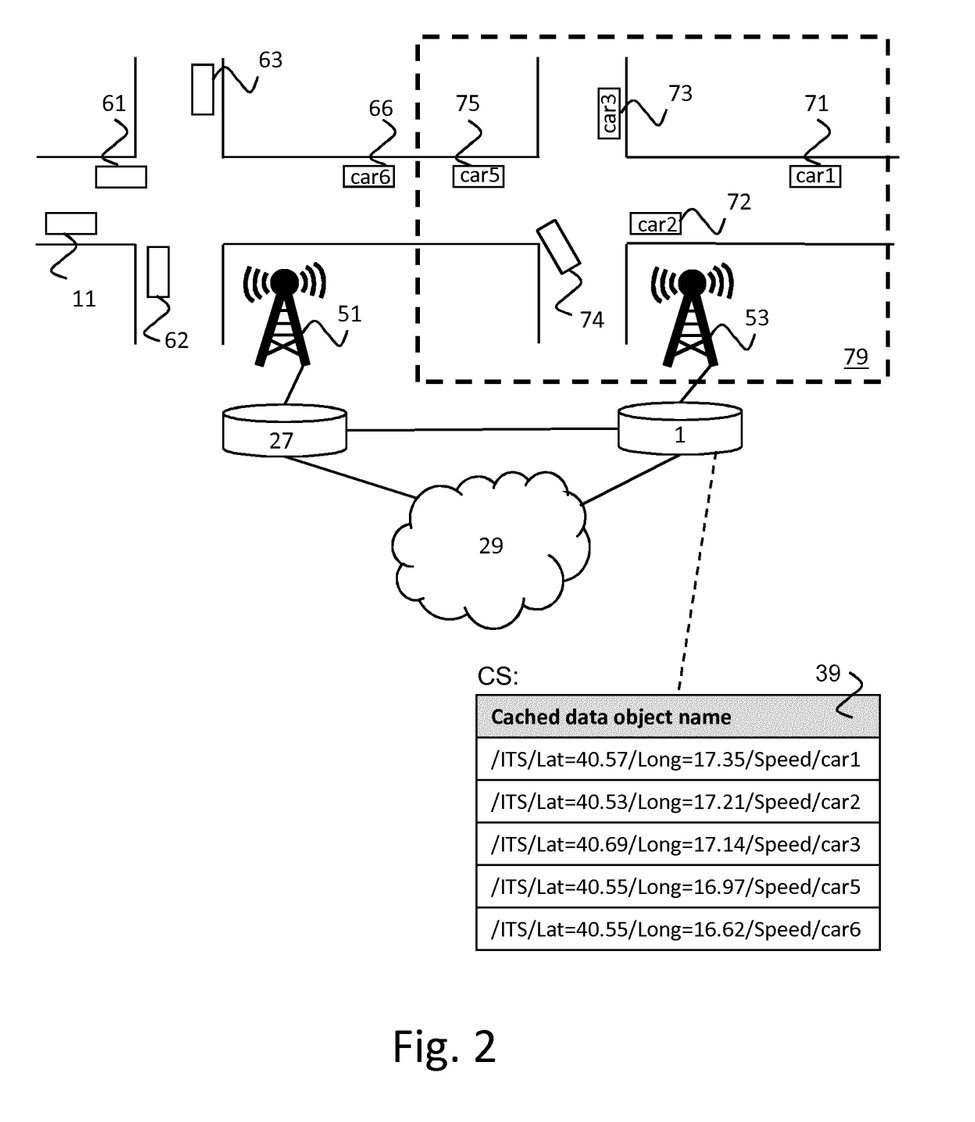
FIG. 2 depicts second embodiments of the network node and the requesting node in a vehicular network.

FIG. 2 shows second embodiments of the network node and the requesting node, which are part of a vehicular network. FIG. 2 depicts an Intelligent Transportation System (ITS) paradigm which utilizes NDN networking over V2X Communication. In the embodiment shown in FIG. 2, the requesting node 11 is used in a vehicle. For example, the requesting node 11 is a vehicle, is embedded in a vehicle or is a (e.g. mobile) device used in a vehicle. The requesting node 11 and vehicles 61 to 66 are located at or near a first intersection and transmit their position and possibly other information like their speed to the network node 27 via base station 51. Vehicles 71 to 75 are located at or near a second intersection and transmit their position and possibly other information like their speed to the network node 1 via a base station 53. One or more of the vehicles 61 to 66 and 71 to 75 may comprise a processor configured in the same way as the processor 15 of requesting node 11. The network node 27 may comprise a processor configured in the same way as the processor 5 of network node 1 (see FIG. 1).

In the embodiment shown in FIG. 2, the vehicles have the functionality of both requestor and producer. The vehicles have the capability of wirelessly communicating among them and are connected to a (backbone) network 29 through wireless communications with base stations (or alternatively Road Side Units). FIG. 2 is used to illustrate how the invention can be used to enhance the efficiency of Range Name Components (RNCs).

In the embodiment shown in FIG. 2, the vehicle comprising requesting node 11 is heading East on the main road and would like to know what the current speed is of vehicles at the next intersection. Even though the navigation functionality that the vehicle has onboard may allow it to be aware of the exact geographical latitude (Lat) and longitude (Long) of that intersection (in this case Lat=40.562, Long=17.123), it is not desirable to issue an interest message with these exact coordinates in its name, as it is not certain that another vehicle is positioned at those exact coordinates and can (or has in the recent past) produce data to satisfy this interest message. A more desirable approach is for the requesting node 11 to issue an RNC interest message, which would allow it to request the current speed of any other vehicle that is "close enough" to the intersection of interest. Using this approach the requesting node 11 may issue an RNC interest message with the following name:

/ITS/Lat={40.3:40.7}/Long={17.0:17.4}/Speed

This interest message requests the current speed of any vehicle whose geographical coordinates satisfy the limits of the respective range, hence increasing its chances of receiving a data message in response.

The RNC interest message issued by requesting node 11 is received by base station 51 and reaches network node 1 through network node 27. Network node 1 receives ITS data from all vehicles around the selected intersection, in particular the vehicles with a latitude between 40.2 and 40.8 and a longitude between 16.6 and 17.4 (indicated as area 79 in FIG. 2), through base station 53 and has some of the requested data in its CS. Alternatively, network node 1 might not have any data in its CS, but may then be able to forward the RNC interest message to the appropriate vehicle through base station 53, based on the geographical range specified in the interest message. In the example depicted in FIG. 2, the CS 39 of the network node 1 is populated as follows:

| Cached data object name |
|---|
| /ITS/Lat = 40.57/Long = 17.35/Speed/car1 |
| /ITS/Lat = 40.53/Long = 17.21/Speed/car2 |

| Cached data object name |
|---|
| /ITS/Lat = 40.69/Long = 17.14/Speed/car3 |
| /ITS/Lat = 40.55/Long = 16.97/Speed/car5 |
| /ITS/Lat = 40.55/Long = 16.62/Speed/car6 |

There are multiple vehicles with geographical coordinates in the requested range of the RNC interest which could return a data message containing their current speed. With legacy NDN, there is no guarantee that network node 1 would return the most suitable data object among the multiple matches in its CS.

For example, network node 1 may decide to return the current speed of vehicle 71 (car 1) as data object, since its geographical coordinates fall in the range requested by requesting node 11. However, this is not the optimal data object to be returned, as vehicle 71 (car 1) is the furthest one from the intersection (from the vehicles with geographical coordinates that fall in the specified range) while vehicle 72 (car 2) is much closer to the intersection and has the same heading as the vehicle comprising requesting node 11, making it a much better fit for the interest of requesting node 11.

By allowing the requesting node 11 to specify a position in the range in the metadata of the interest message, the requesting node 11 may, for example, be able to define that it is interested in the requested range with a preference for data items closer to its average/median (or closer to the minimum, or maximum), thereby receiving the best fitting data. Alternatively or additionally, network node 1 might be able to select more appropriate matches for the range requests based on usage data (e.g. in rush hour most requests will be for a certain heading). The network node 1 may use further information specified in the metadata in combination with the usage data gathered at the network node 1. This further information may comprise the heading of the vehicle that issued the interest message, the geographical coordinates of the vehicle that issued the interest message and/or the time at which the vehicle issued the interest message, for example.

Similar criteria may be applied to select a subset from a plurality of communication interfaces associated with one or more matching prefixes in the FIB when forwarding the interest message. With Range Name Components and legacy NDN, if network node 1 does not have a matching data object in its CS and needs to forward the interest message, a returned data object may meet the range criteria, but is likely not the most suitable data object. Applying the one or more criteria in order to select a subset of communication interfaces has similar advantages as applying the one or more criteria to select from multiple matching data objects in the CS.

For example, if the interest name is "/ITS/Lat={40.3: 40.7}/Long={17.0:17.4}/Speed", the metadata specifies a preference for a position closest to the center of the range and the prefixes in the FIB specify "/ITS/Lat=40.57" for car1, "/ITS/Lat=40.53" for car2 and "/ITS/Lat=40.69" for car3, then the interest message is forwarded on the communication interface associated with car2 (whose longitude of 40.53 is closest the center of the range: longitude 40.5).

Figure 3:
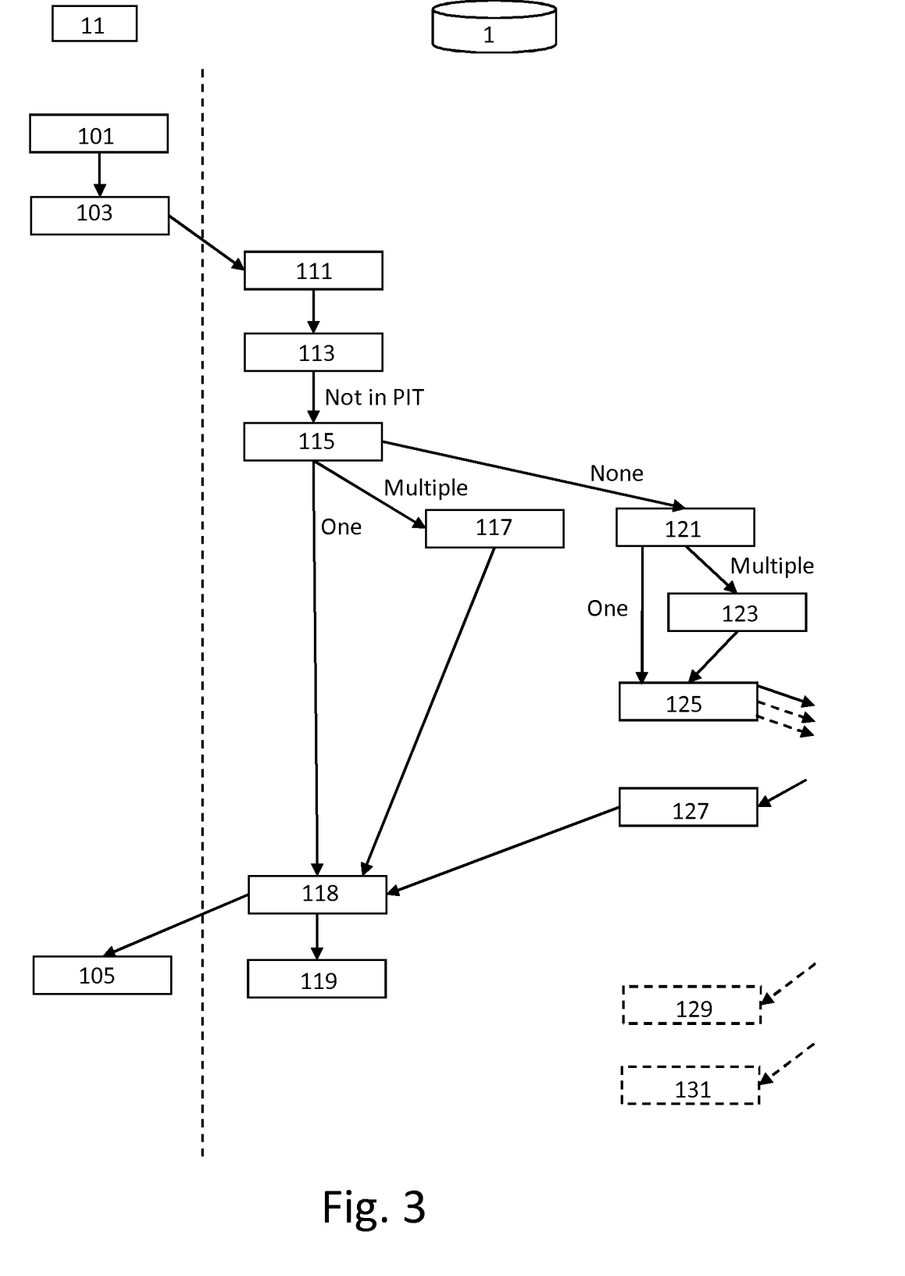
FIG. 3 is a first flow diagram illustrating embodiments of the methods of the invention.

Embodiments of the methods of transmitting and receiving an interest message are shown in FIG. 3. A step 101 comprises a requesting node 11 creating an interest message comprising a request for a data object and metadata specifying one or more criteria to be used by a network node for selecting a subset of a plurality of items when there is a match between the requested data object and the plurality of items. At least one of the one or more criteria is a preference specified for at least one of: factual properties of the plurality of items, usage data related to the plurality of items, usage data related to at least one communication interface, an effort to obtain data from another network node, and a position in a range specified in the interest message. A step 103 comprises the requesting node transmitting the interest message.

A step 111 comprises a network node 1 receiving the interest message. A step 113 comprises the network node checking whether the interest, in this embodiment the name specified in the interest message, is already present in the PIT. If the interest is already present in the PIT, the process with respect to this interest message will stop and the network node will continue to wait for a data message in response to a previously transmitted interest message. If the interest is not present in the PIT, step 115 is performed next. Step 113 is optional. For example, no PIT may be used in an alternative embodiment. Steps 115 and 121 comprise the network node determining whether there is a match between the requested data object and a plurality of items, steps 117 and 123 comprise the network node selecting a subset of the plurality of items by applying the one or more criteria if the match has been determined to exist. Steps 115, 117, 121 and 123 are described in more detail in the next paragraphs.

Step 115 comprises the network node determining whether a plurality of data objects in the CS matches the requested data object, in this embodiment the name specified in the interest message. If a plurality of data objects has been determined to match the requested data object, step 117 is performed next. Step 117 comprises the network node selecting one of the plurality of data objects by applying the one or more criteria. Step 117 requires that at least one of the one or more criteria is a preference specified for at least one of: factual properties of the plurality of data objects, usage data related to the plurality of data objects, and a position in a range specified in the interest message.

If none of the data objects in the CS matches the requested data object, step 121 is performed next. If only one of the data objects in the CS matches the requested data object, this one data object is returned in a data message in step 118. Otherwise, the data object selected in step 117 is returned in a data message in step 118. Step 105 comprises the requesting node receiving the data message.

Step 121 comprises the network node determining whether the requested data object matches one or more prefixes in the FIB and whether the one or more matching prefixes are associated with a plurality of communication interfaces. Normally, a default route is configured and a requested data object therefore matches at least one prefix in the FIB. If the one or more matching prefixes are associated with a plurality of communication interfaces (e.g. if the requested data object matches a plurality of prefixes), step 123 is performed next. If the one or more matching prefixes are associated with only one communication interface, the interest message is forwarded on this one communication interface in a step 125.

Step 123 comprises the network node selecting a subset of the plurality of communication interfaces by applying the one or more criteria. Step 123 requires that at least one of the one or more criteria is a preference specified for at least one of: usage data related to the communication interfaces of the network node, an effort to obtain data from another network node, and a position in a range specified in the interest message. Next, step 125 comprises the network node forwarding the interest message on the selected communication interface(s).

Step 125 further comprises the network node adding the interest to the PIT. Step 127 comprises the network node receiving a first data message comprising a first data object in response to the forwarded interest message. Next, the network node forwards the first data message to the requesting node in step 118. The interest added to the PIT in step 125 is removed from the PIT in step 119.

In the example shown in FIG. 3, the interest message is forwarded on three communication interfaces and a data message is received back on these three communication interfaces. Step 129 comprises the network node receiving a second data message which comprises a second data object in response to the forwarded interest message. Step 131 comprises the network node receiving a third data message which comprises a third data object in response to the forwarded interest message. The second and the third data objects are not returned to the requesting node.

The following criteria may be beneficial for selecting one from a plurality of data objects in a CS:
  a preferred data object size;
  a preferred minimum data object size;
  a preferred maximum data object size;
  a preferred data object content type;
  number of child nodes;
  a preference for a date and time after which the data object was produced;
  a preference for a date and time before which the data object was produced;
  a preference for the most recently produced data object;
  a preference for the most frequently transmitted data object;
  a preference for the least frequently transmitted data object;
  a preference for the most recently transmitted data object; and
  a preference for the least recently transmitted data object.

The number of child nodes associated with a data object may be calculated by determining the highest hierarchical level to which the data object belongs, but which is not specified in the interest name, and determining the number of data objects belonging to this hierarchical level. For example, if an interest message specifies the interest name "/schiphol", then the data objects named "schiphol/flight_schedule/cargo" and "schiphol/flight_schedule/commercial" in the CS 31 of network node 1 of FIG. 1 are associated with two child nodes (hierarchical level "flight_schedule" has two data objects belonging to it) and the data object named "schiphol/lostNfound/commercial" in the CS 31 is associated with one child node (hierarchical level "lostNfound" has one data object belonging to it).

Alternatively or additionally, RNC interest messages may specify a criterion which indicates a preference for an item matching a certain part of the specified range, such as:
  The item whose name is closest to the center of the range
  The item object whose name is the median of all data items in the range For example, in case a requesting node issues an interest message with the name: /NL/airtraffic/Arrivals_Schedule and there are 2 matches in a network node's CS with the names /NL/airtraffic/Arrivals_Schedule/Schiphol-Amsterdam and /NL/airtraffic/Arrivals_Schedule/Eindhoven, they are both good candidates, but if the metadata of the issued interest message specifies a preference for the most frequently used item (and assuming that the arrivals schedule in Schiphol-Amsterdam is more popular because that's a bigger airport), then the /Schiphol-Amsterdam variant is returned.

The following criteria may be beneficial for selecting a subset from a plurality communication interfaces associated with one or more matching prefixes in a FIB:
- a preferred maximum number of hops between the originator of the interest message and a network node which stores and transmits a data object matching the requested data object;
- a preferred maximum latency between the originator of the interest message and a network node which stores and transmits a data object matching the requested data object;
- a preference for a communication interface on which data messages have been received most frequently;
- a preference for a communication interface on which data messages have been received least frequently;
- a preference for a communication interface on which a data message was received most recently; and
- a preference for a communication interface on which a data message was least recently received.

Alternatively or additionally, RNC interest messages may specify a criterion which indicates a preference for an item matching a certain part of the specified range, such as:
- The item whose name is closest to the center of the range
- The item whose name is the median of all data items in the range If the requested data object, e.g. the name of the interest, matches a plurality of prefixes, this criterion may be used to select a subset of the plurality of prefixes and thereby a subset of the plurality of communication interfaces. This criterion may be applied to an RNC interest message if the range relates to a part of the prefix, e.g. if the interest name specifies "/ITS/Lat={40.3:40.7}/Long={17.0:17.4}/Speed" and the prefix in the FIB specifies "/ITS/Lat=40.53".

For example, in case a requesting node issues an interest message with the name: /temperature/Amsterdam/Kalverstraat and there are 2 matches in the FIB with the names /temperature/Amsterdam/Kalverstraat/streetnumber/2 and /temperature/Amsterdam/Kalverstraat/streetnumber/35, they are both good candidates, but if data objects received on the communication interface associated with the /streetnumber/2 prefix are on average located 3 hops away and if data objects received on the communication interface associated with the /streetnumber/35 prefix are on average located one hop away, then the communication interface associated with the /streetnumber/35 prefix is selected for forwarding. Information on how many hops away data objects received on a communication interface associated with a prefix are on average located may be stored in the FIB in relation to the prefix or may be stored elsewhere in relation to the communication interface, for example.

Figure 4:
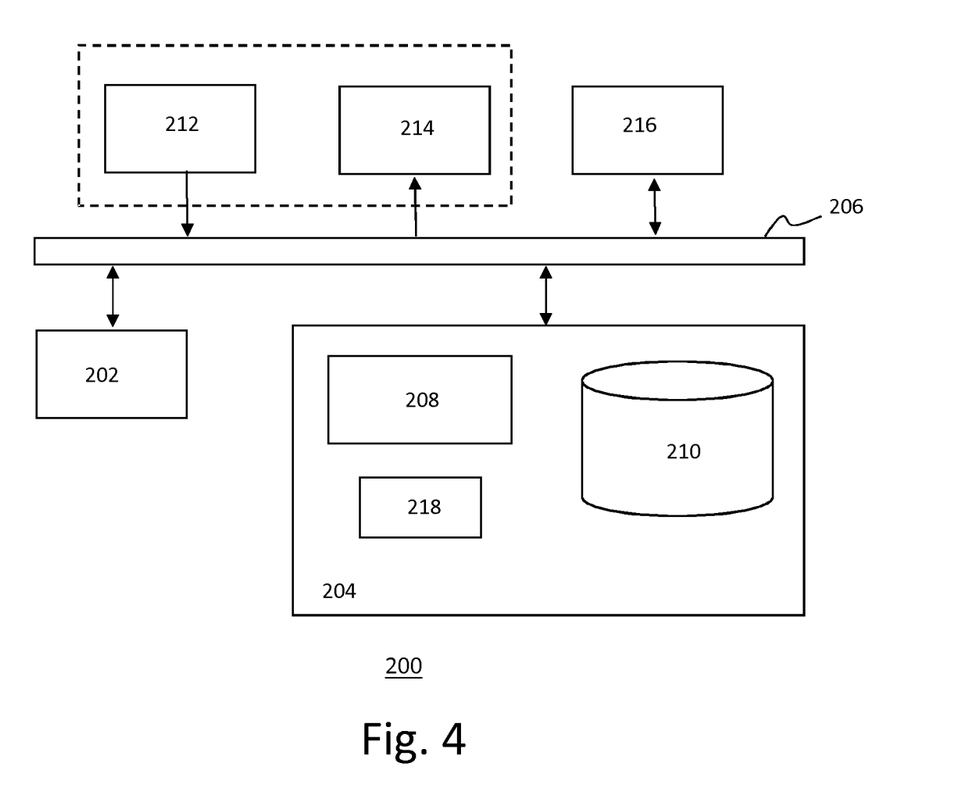
FIG. 4 is a block diagram of an exemplary data processing system for performing the methods of the invention.

FIG. 4 depicts a block diagram illustrating an exemplary data processing system that may perform the methods as described with reference to FIG. 3.

As shown in FIG. 4, the data processing system 200 may include at least one processor 202 coupled to memory elements 204 through a system bus 206. As such, the data processing system may store program code within memory elements 204. Further, the processor 202 may execute the program code accessed from the memory elements 204 via a system bus 206. In one aspect, the data processing system may be implemented as a computer that is suitable for storing and/or executing program code. It should be appreciated, however, that the data processing system 200 may be implemented in the form of any system including a processor and a memory that is capable of performing the functions described within this specification.

The memory elements 204 may include one or more physical memory devices such as, for example, local memory 208 and one or more bulk storage devices 210. The local memory may refer to random access memory or other non-persistent memory device(s) generally used during actual execution of the program code. A bulk storage device may be implemented as a hard drive or other persistent data storage device. The processing system 200 may also include one or more cache memories (not shown) that provide temporary storage of at least some program code in order to reduce the number of times program code must be retrieved from the bulk storage device 210 during execution.

Input/output (I/O) devices depicted as an input device 212 and an output device 214 optionally can be coupled to the data processing system. Examples of input devices may include, but are not limited to, a keyboard, a pointing device such as a mouse, or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 4 with a dashed line surrounding the input device 212 and the output device 214). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 216 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 200, and a data transmitter for transmitting data from the data processing system 200 to said systems, devices and/or networks. Modems, cable modems, and Ethernet cards are examples of different types of network adapter that may be used with the data processing system 200.

As pictured in FIG. 4, the memory elements 204 may store an application 218. In various embodiments, the application 218 may be stored in the local memory 208, the one or more bulk storage devices 210, or separate from the local memory and the bulk storage devices. It should be appreciated that the data processing system 200 may further execute an operating system (not shown in FIG. 4) that can facilitate execution of the application 218. The application 218, being implemented in the form of executable program code, can be executed by the data processing system 200, e.g., by the processor 202. Responsive to executing the application, the data processing system 200 may be configured to perform one or more operations or method steps described herein.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 202 described herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration, but is not intended to be exhaustive or limited to the implementations in the form disclosed. Many modifications and variations will be apparent to those of ordinary skill in the art. The embodiments were chosen and described in order to best explain the principles and some practical applications of the present invention, and to enable others of ordinary skill in the art to understand the present invention for various embodiments with various modifications as are suited to the particular use contemplated.

The invention claimed is:

1. A network node, comprising:
at least one communication interface; and
at least one processor configured to:
receive, on a communication interface of the at least one communication interface, an interest message for requesting return of a named data object, the interest message comprising a name of the requested named data object and metadata, the metadata specifying one or more selection criteria,
based on the name of the requested named data object, make a determination of whether there are any candidate items that match the requested named data object,
when a plurality of candidate items that each match the requested named data object is found, select a subset of the plurality of candidate items by applying the one or more selection criteria to the plurality of candidate items,
wherein at least one of the one or more selection criteria is a preference specified for at least one of: one or more factual properties of the plurality of candidate items, usage data related to the plurality of candidate items, usage data related to the at least one communication interface, an effort to obtain data from another network node, or a position in a range specified in the interest message,
and wherein the one or more factual properties of the plurality of candidate items are at least one of a data object size, a minimum data object size, a maximum data object size, a data object content type, a date and time after which a data object was produced, a date and time before which a data object was produced, or an indication of a most recently produced data object,
in response to receiving and processing the interest message, retrieve one named data object matching the name of the requested named data object, and
return the retrieved one named data object matching the name of the requested named data object on the communication interface.

2. The network node of claim 1, wherein the determination of whether there are any candidate items that match the requested named data object comprises a determination of whether there are any data objects in one or more memories of the network node that match the requested named data object,
and wherein retrieving the one named data object matching the name of the requested named data object comprises:
when a plurality of data objects that each match the requested named data object is found in the one or more memories of the network node, selecting one of the plurality of data objects by applying the one or more selection criteria and returning the selected data object in a data message on the communication interface of the at least one communication interface,
wherein at least one of the one or more selection criteria is a preference specified for at least one of: one or more factual properties of the plurality of data objects, usage data related to the plurality of data objects, or a position in a range specified in the interest message.

3. The network node of claim 2, wherein the one or more factual properties of the plurality of data objects are at least one of: a data object size, a minimum data object size, a maximum data object size, a data object content type, a date and time after which the data object was produced, a date and time before which the data object was produced, or a preference for the most recently produced data object.

4. The network node of claim 2, wherein usage data related to the plurality of data objects is at least one of:
an indication of the most frequently transmitted data object,
an indication of the least frequently transmitted data object,
an indication of the most recently transmitted data object, or
an indication of the least recently transmitted data object.

5. The network node of claim 2, wherein the at least one processor is further configured to record a time at which the selected data object is returned upon returning the selected data object in the data message.

6. The network node of claim 2, wherein the at least one processor is further configured to record a number of times the selected data object has been returned upon returning the selected data object in the data message.

7. The network node of claim 1, wherein the determination of whether there are any candidate items that match the requested named data object comprises a determination of whether the requested named data object matches one or more prefixes in a forwarding table and whether the one or more matching prefixes are associated with a plurality of communication interfaces,
   and wherein retrieving the one named data object matching the name of the requested named data object comprises:
   when one or more matching prefixes associated with the plurality of communication interfaces are found, selecting a subset of the plurality of communication interfaces by applying the one or more selection criteria and forwarding the interest message on the subset of the plurality of communication interfaces,
   wherein at least one of the one or more selection criteria is a preference specified for at least one of: usage data related to the at least one communication interface, an effort to obtain data from another network node, or a position in a range specified in the interest message.

8. The network node of claim 7, wherein the effort to obtain data from another network node comprises a maximum number of hops between the originator of the interest message and a network node which stores and transmits a data object matching the requested named data object and/or a maximum latency between the originator of the interest message and a network node which stores and transmits a data object matching the requested named data object.

9. The network node of claim 7, wherein usage data related to the at least one communication interface is at least one of:
   an indication of a communication interface on which data messages have been received most frequently,
   an indication of a communication interface on which data messages have been received least frequently,
   an indication of a communication interface on which a data message was received most recently, or
   an indication of a communication interface on which a data message was least recently received.

10. The network node of claim 7, wherein the at least one processor is configured to record a time at which a data message is received on a communication interface upon receiving the data message on the communication interface.

11. The network node of claim 7, wherein the at least one processor is configured to record a number of times data messages have been received on a communication interface upon receiving a data message on the communication interface.

12. A requesting node, comprising:
   at least one communication interface; and
   at least one processor configured to:
   create an interest message for requesting return of a named data object, the interest message comprising a name of the requested named data object and metadata specifying one or more criteria to be used by a network node for selecting a subset of a plurality of candidate items when there is a match between the requested named data object and the plurality of candidate items, at least one of the one or more selection criteria being a preference specified for at least one of: one or more factual properties of the plurality of candidate items, usage data related to the plurality of candidate items, usage data related to at least one communication interface of the network node, an effort to obtain data from another network node, or a position in a range specified in the interest message,
   wherein the one or more factual properties of the plurality of candidate data items are at least one of a data object size, a minimum data object size, a maximum data object size, a data object content type, a date and time after which a data object was produced, a date and time before which a data object was produced, or an indication of a most recently produced data object,
   transmit the interest message on the at least one communication interface, and
   in response to transmitting the interest message, receive one named data object matching the name of the requested named data object on the at least one communication interface.

13. A method of receiving an interest message, the method comprising:
   receiving an interest message for requesting return of a named data object, the interest message comprising a name of the requested named a data object and metadata, the metadata specifying one or more selection criteria;
   based on the name of the requested named data object, determining whether there are any candidate items that match the requested named data object;
   when a plurality of candidate items that each match the requested named data object is found, selecting a subset of the plurality of candidate items by applying the one or more selection criteria to the plurality of candidate items,
   wherein at least one of the one or more selection criteria is a preference specified for at least one of: one or more factual properties of the plurality of candidate items, usage data related to the plurality of candidate items, usage data related to at least one communication interface, an effort to obtain data from another network node, or a position in a range specified in the interest message,
   and wherein the one or more factual properties of the plurality of candidate items are at least one of a data object size, a minimum data object size, a maximum data object size, a data object content type, a date and time after which a data object was produced, a date and time before which a data object was produced, or an indication of a most recently produced data object;
   in response to receiving and processing the interest message, retrieving one named data object matching the name of the requested named data object; and
   returning the retrieved one named data object matching the name of the requested named data object on the communication interface.

14. A method of transmitting an interest message, the method comprising:
   creating an interest message for requesting return of a named data object, the interest message comprising a name of the requested data object and metadata specifying one or more selection criteria to be used by a network node for selecting a subset of a plurality of candidate items when there is a match between the requested named data object and the plurality of candidate items, at least one of the one or more selection criteria being a preference specified for at least one of: one or more factual properties of the plurality of candidate items, usage data related to the plurality of items, usage data related to at least one communication interface, an effort to obtain data from another network node, or a position in a range specified in the interest message,
   wherein the one or more factual properties of the plurality of candidate items are at least one of a data object size, a minimum data object size, a maximum data object size, a data object content type, a date and time after which a data object was produced, a date and time before which a data object was produced, or an indication of a most recently produced data object;

transmitting the interest message; and in response to transmitting the interest message, receiving one named data object matching the name of the requested named data object on the at least one communication interface.

15. A non-transitory computer-readable medium having instructions stored thereon that, when executed by one or more processors of a system, cause the system to carry out operations including:

receiving an interest message for requesting return of a named data object, the interest message comprising a name of the requested data object and metadata, the metadata specifying one or more selection criteria;

based on the name of the requested named data object, determining whether there are any candidate items that match the requested named data object;

when a plurality of candidate items that each match the requested named data object is found, selecting a subset of the plurality of candidate items by applying the one or more selection criteria to the plurality of candidate items, wherein at least one of the one or more selection criteria is a preference specified for at least one of: one or more factual properties of the plurality of candidate items, usage data related to the plurality of candidate items, usage data related to at least one communication interface, an effort to obtain data from another network node, or a position in a range specified in the interest message, and wherein the one or more factual properties of the plurality of candidate items are at least one of a data object size, a minimum data object size, a maximum data object size, a data object content type, a date and time after which a data object was produced, a date and time before which a data object was produced, or an indication of a most recently produced data object;

in response to receiving and processing the interest message, retrieving one named data object matching the name of the requested named data object; and returning the retrieved one named data object matching the name of the requested named data object on the communication interface.

16. A non-transitory computer-readable medium having instructions stored thereon that, when executed by one or more processors of a system, cause the system to carry out operations including:

creating an interest message for requesting return of a named data object, the interest message comprising a name of the requested data object and metadata specifying one or more selection criteria to be used by a network node for selecting a subset of a plurality of candidate items when there is a match between the requested named data object and the plurality of candidate items, at least one of the one or more selection criteria being a preference specified for at least one of: one or more factual properties of the plurality of candidate items, usage data related to the plurality of candidate items, usage data related to at least one communication interface, an effort to obtain data from another network node, or a position in a range specified in the interest message, wherein the one or more factual properties of the plurality of candidate items are at least one of a data object size, a minimum data object size, a maximum data object size, a data object content type, a date and time after which a data object was produced, a date and time before which a data object was produced, or an indication of a most recently produced data object;

transmitting the interest message; and in response to transmitting the interest message, receiving one named data object matching the name of the requested named data object on the at least one communication interface.

\* \* \* \* \*